Sept. 6, 1927.
H. A. TRULLINGER ET AL
1,641,610
NEST
Filed June 29, 1926
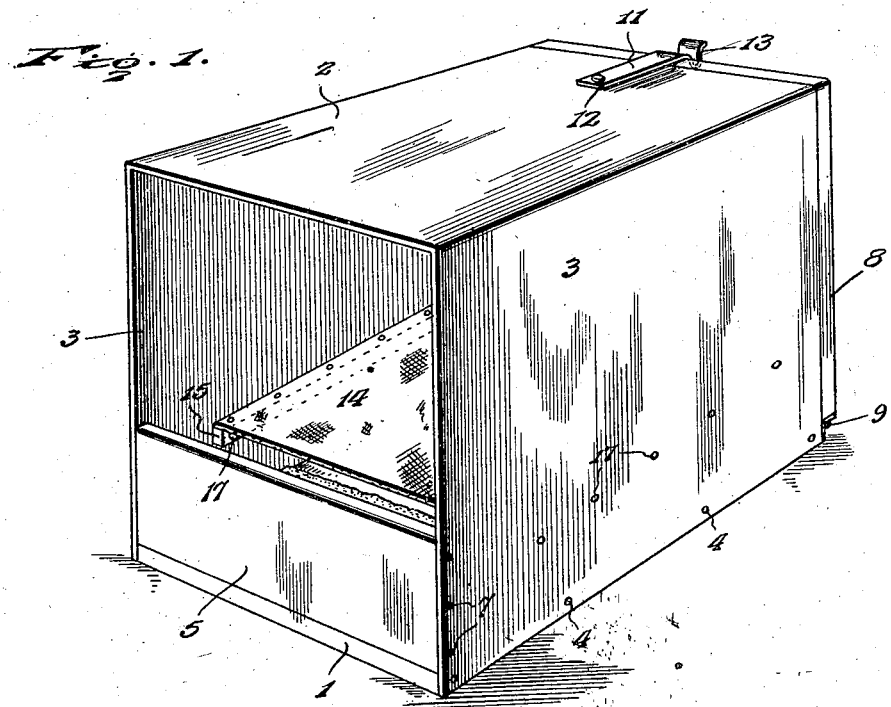
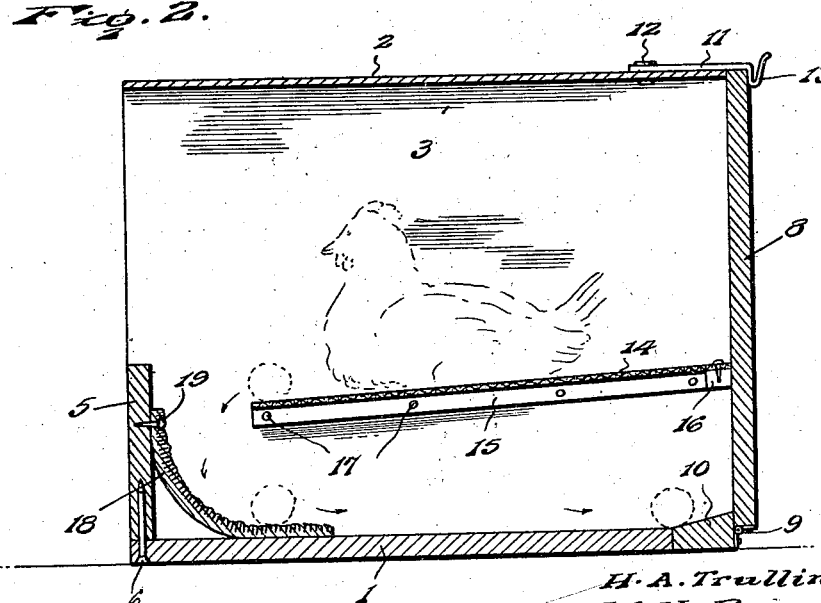
Inventors
H. A. Trullinger.
W. H. Reynolds.
By Lacey & Lacey, Attorneys Patented Sept. 6, 1927.

1,641,610

UNITED STATES PATENT OFFICE.

HERBERT A. TRULLINGER AND WILLIAM HAROLD REYNOLDS, OF CLACKAMAS COUNTY, OREGON.

NEST.

Application filed June 29, 1926. Serial No. 119,402.

This invention relates to nests of the type used by poultry raisers, and one object of the invention is to prevent eggs from being eaten or accidentally broken by the poultry.

Another object of the invention is to provide a nest which the poultry may readily enter and leave and from which the eggs may be removed without disturbing a hen occuping the nest.

Another object of the invention is to so mount a laying platform in the housing or body portion of the nest that an egg may roll therefrom into the lower portion of the nest.

Another object of the invention is to prevent the egg from being broken when it drops from the laying platform and guide it onto the bottom of the nest beneath the platform.

This invention is illustrated in the accompanying drawing, wherein

Figure 1 is a perspective view of the improved nest;

Fig. 2 is a longitudinal sectional view through the nest.

The housing or body portion of the nest includes a bottom or flooring 1, a top 2 and side walls 3. The bottom is preferably formed of wood, although other material may be employed and the top and sides are preferably formed from a continuous strip of sheet metal which is bent in spaced relation to its ends and at its ends is secured against the side edges of the bottom by nails or other suitable fasteners 4. A guard wall 5 extends between the lower portions of the side walls at the rear or entrance end of the housing and is secured to the bottom 1 and side walls 3 by nails or other suitable fasteners 6 and 7 driven upwardly through the bottom and inwardly through the side walls. The guard wall terminates in a short distance above the bottom so that a hen may readily enter or leave the nest.

The opposite end or front of the housing is normally closed by a door 8 which is hingedly mounted at its lower end by hinges 9, the leaves of which are secured to the lower edge of the door and outer edge of a cross strip 10 which completes the bottom or flooring 1. It should be noted that in cross section the strip 10 is formed as shown in Fig. 2 and has its upper surface extending inwardly at a downward incline so that, when the door is released from the latch 11 and swung downwardly to an open position, there will be no danger of eggs rolling out of the housing. The latch 11 may be of any suitable construction but is preferably formed from a strip of resilient sheet metal secured at its inner end to the upper wall of the housing by a rivet or other suitable fastener 12 and having its outer end portion bent to form a bill 13 which may be sprung into and out of engagement with the upper end of the door.

The platform upon which the hen sits is mounted in the housing at an incline, as shown in Fig. 2, and includes a sheet of fabric 14, the sides and one end portion of which are tacked or otherwise firmly secured to side strips 15 and a cross strip 16 cooperating with the side strips to form a mounting frame. The cross strip 16 is securely nailed or otherwise secured between the ends of the side strips 15 and these side strips are firmly secured against the inner faces of the side walls 3 by nails, rivets or other suitable fasteners 17. Since the platform extends from the end of the housing closed by the door 8 towards the guard wall 5 at a downward incline and terminates in spaced relation to the guard wall, it will be readily seen that, when a hen rises from the nest, an egg laid by the hen will roll downwardly along the platform and drop into the lower portion of the housing between the platform and guard wall.

In order to prevent the egg from being broken when it drops from the platform, there has been provided a bumper 18. The bumper is preferably formed from a strip of carpet although canvas or any other fabric having sufficient stiffness to protect the egg may be employed. The strip of fabric forming the bumper is secured against the inner face of the guard wall by nails or other suitable fasteners 19 and curves downwardly and inwardly away from the guard wall and rests upon the bottom or flooring 1 of the housing. An egg dropping from the platform will strike the portion of the bumper strip which is elevated from the floor and will then roll along the bumper strip onto the flooring and rest thereon beneath the platform. A hen will be prevented from eating an egg as it will roll off the laying platform as soon as the hen rises and cannot be reached by the hen when beneath the platform. This arrangement not only prevents a hen from eating an egg but also prevents danger of an egg being broken by a hen stepping upon it when entering or leaving the nest.

The nest may be mounted upon a suitable shelf or other support in such position that the door 8 may be readily swung downwardly. If a number of nests are built in side to side relation to each other a common flooring board may be employed for all of the nests and if desired a common door may also be used. It is preferred, however, to have a separate door for each nest so that eggs may be removed from one without disturbing hens occupying the others.

Having thus described the invention, we claim:

A nest comprising a housing open at its ends and including a bottom, side walls, and a top, a guard wall extending upwardly from said bottom between the side walls at one end of the housing, a closure door for the other end of the housing, a strip forming a portion of the bottom of said housing having said door hinged thereto and formed with an upper surface extending inwardly at a downward incline, a platform in said housing extending at a downward incline towards said guard wall and spaced therefrom, and means beneath the inner end of said platform to guide an egg dropped from the platform onto the bottom beneath the platform.

In testimony whereof we affix our signatures.

HERBERT A. TRULLINGER. [L. S.]
    WILLIAM HAROLD REYNOLDS. [L. S.]